United States Patent [19]

O'Brien et al.

[11] Patent Number: 5,270,948

[45] Date of Patent: Dec. 14, 1993

[54] CONTROL MEANS INCLUDING A DIAGNOSTIC OPERATING MODE FOR A STERILIZER

[75] Inventors: Michael J. O'Brien, Churchville; Charles E. Ellis, Jr., Phelps; Kenneth A. Johnson, Walworth, all of N.Y.

[73] Assignee: MDT Corporation

[21] Appl. No.: 649,445

[22] Filed: Feb. 1, 1991

[51] Int. Cl.$^5$ .................................... G06F 15/20
[52] U.S. Cl. .................. 364/550; 364/184; 364/186; 364/551.01; 422/119
[58] Field of Search .......... 364/184, 186, 550, 551.01; 422/119

[56] References Cited

U.S. PATENT DOCUMENTS

| | | | |
|---|---|---|---|
| Re. 31,247 | 5/1983 | Johnstone | 364/186 X |
| 4,138,216 | 2/1979 | Larsson et al. | 422/58 X |
| 4,155,116 | 5/1979 | Tawfik et al. | 364/186 |
| 4,865,814 | 9/1989 | Childress | 364/551.01 X |
| 4,923,681 | 5/1990 | Cox et al. | 422/116 |
| 5,098,200 | 3/1992 | O'Brien et al. | 374/163 |
| 5,122,344 | 6/1992 | Schmoegner | 422/111 |
| 5,145,642 | 9/1992 | Feathers, III et al. | 422/112 X |

*Primary Examiner*—Edward R. Cosimano
*Attorney, Agent, or Firm*—Trask, Britt & Rossa

[57] ABSTRACT

The electronic microprocessor controller of a sterilizer includes a circuit board functionally controlled by software. The software includes a fist user operation mode for normal operation of the sterilizer. A diagnostic operation mode is initiated by insertion of a jumper in the circuit board, and provides for repetitive cycle operation without opening the door, quickly advancing to a cycle phase, without completion of intervening phases, printing of variables not available in the user operation mode, and calibration of the circuitry.

7 Claims, 1 Drawing Sheet

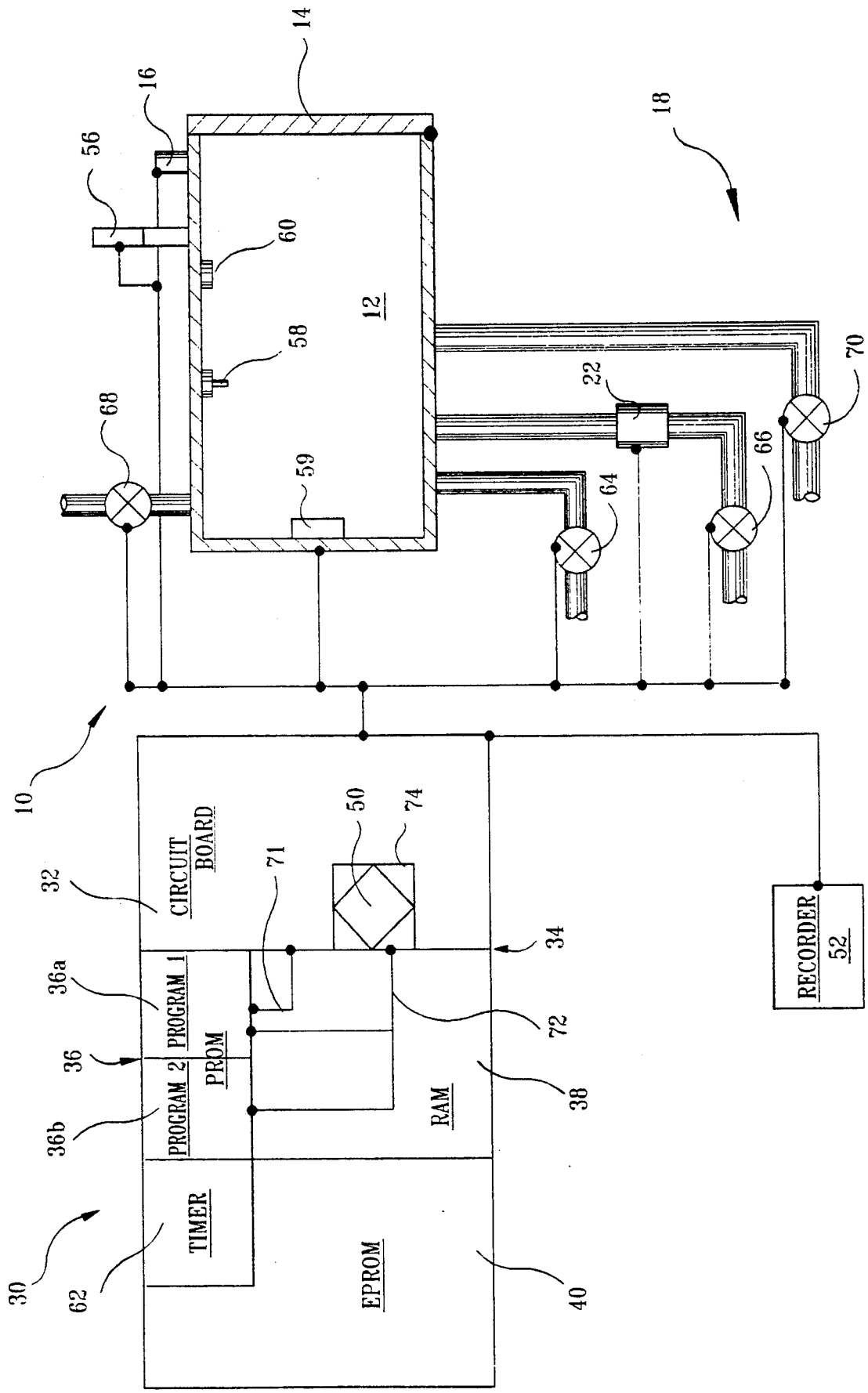

CONTROL MEANS INCLUDING A DIAGNOSTIC OPERATING MODE FOR A STERILIZER

BACKGROUND OF THE INVENTION

1. Field

The invention relates to apparatus having programmable microprocessor control. More particularly, the invention pertains to the electronic operation, diagnosis and analysis of the control systems of sterilizers.

2. State of the Art

In the past, sterilizers have utilized electronic microprocessors for controlling the operation of the machines in prescribed sequential phases such as power-on, evacuation, sterilant introduction, processing/sterilizing, purging, and cycle completion. Each phase normally includes a number of discrete operations. In normal operation, certain conditions such as sterilization time and temperature can be preset by the user.

Diagnosis to determine the cause of apparent aberrations has generally comprised running the sterilizer through complete cycles while observing the operation. Often, the diagnosis consists of an educated guess as to the cause of the aberration. After each attempt at repair, the sterilizer is operated through a number of complete cycles to determine if a proper repair has been made and the machine is operating properly. As a result, the diagnosis, repair and testing has been a time-consuming operation, with most of the time often being consumed in performing functions unnecessary to the actual repair of the sterilizer. Furthermore, additional hook-ups to sensing and control circuits have often been necessary to obtain temperature, pressure, and/or other data not indicated or printed out in normal operation.

Testing during and following the manufacture of a particular sterilizer unit has been typically performed by operating the unit through one or more complete cycles at each standard condition of sterilization time and temperature, etc. It has been necessary to perform such manual operations as opening the chamber door between each cycle, for example. Typically, testing of the sterilant "dump" operation, in which sterilant is introduced into the chamber, has included long waiting periods while the remainder of the cycle phases were being run. "Homing in" on a particular phase of the cycle, or a particular step of the phase, generally included long periods of unproductive trial and error operation.

The need for an improved method and apparatus for diagnosing the operation and equipment integrity of sterilizers and the like has long been apparent.

SUMMARY OF THE INVENTION

The invention comprises a microprocessor control system for a sterilizer. The system has a first, user operating mode for controlling a normal operation of the sterilizer apparatus, and a second, diagnostic mode controlled by installation and removal of a jumper in a printed circuit board.

The circuit board is configured to permit the sterilizer to be operated in ordered sequential programmed phases of power-on, evacuation of the chamber, addition of sterilant, activation of heaters, venting, purging, cycle completion, and the like. The phases are controlled on the basis of time or sterilizer conditions such as temperature, type of sterilant, chamber pressure, etc.

An exemplary sterilizer to which the invention may be applied is disclosed in U.S. Pat. No. 5,145,642, issued Sep. 8, 1992, titled LOAD COMPENSATED WATER FILL FOR A TABLETOP STERILIZER, by Feathers et al. of same assignee. The disclosure of this related application is herein incorporated by reference.

The instructions for carrying out the phases of the user operating mode and the diagnostic mode are programmed as software in the microprocessor memory storage.

The diagnostic mode software uses the same circuit board as the normal operating mode, but in several different ways is designed to provide control methods particularly useful in testing, trouble-shooting and debugging the sterilizer during and subsequent to manufacture.

The diagnostic mode software permits a technician to advance the sterilizer through multiple sterilization cycles without opening the door between each cycle. Thus, multiple test cycles may be run before a unit is shipped to a customer, to enable timely detection and correction of possible faults in the apparatus and control thereof.

Activation of the diagnostic mode software permits rapid calibration of a control system, including the temperature measurement system. The diagnostic mode is particularly applicable to the calibration of temperature monitoring apparatus such as described in U.S. Pat. No. 5,098,200, issued Mar. 24, 1992, by the same inventors, having the title DUAL RANGE TEMPERATURE MONITORING CIRCUITS, which is incorporated herein by reference.

Another feature of the diagnostic mode is the display and optional recording of measurements not usually provided in the User Operation mode. Thus, the chamber wall temperature is displayed and recorded in the diagnostic mode, whereas in the user operating mode it is only used for temperature control and is not displayed or recorded. This permits rapid detection of a leak or other manufacturing defect, or a fault in the control software and circuitry.

In addition, the control circuit may be advanced to any given phase without completing intervening phases. This permits repetitive cycles of a particular phase to be run without operating the complete programmed sterilization cycle.

The diagnostic mode is enabled by insertion of a jumper in the printed circuit board. Thus, the diagnostic mode is not readily available to the sterilizer user, but may be simply initiated by a repair technician upon accessing of the printed circuit board. An untrained user is deterred from attempting repairs or re-setting the values of variables initially programmed into the control system.

BRIEF DESCRIPTION OF THE DRAWING

In the Drawing

The sole FIGURE of the drawing, which illustrates what is presently regarded as the best mode for carrying out the invention, is a schematic view of a microprocessor controlled sterilizer.

DETAILED DESCRIPTION OF THE EMBODIMENTS

A sterilizer 10 typically comprises a sterilization chamber 12 into which goods and articles (not shown) are placed for contact with a sterilant (not shown). The chamber 12 has a sealable door 14 which, in some cases, may be lockable and maintained in a locked position during operation by a controller 16. The sterilant may be a heated vapor such as steam or vaporized chemical, or a gas such as ethylene oxide. The sterilization system includes hardware such as a valved conduit means, shown generally at 18, for evacuating the chamber, introducing sterilant, venting the chamber, purging the chamber, etc. The temperature and/or pressure within the chamber are usually measured and controlled. The chamber may include heating means 22 for vaporizing the liquid sterilant and maintaining a desired chamber temperature.

The microprocessor 30 which controls the operation of the sterilizer 10 includes fixed or hard-wired circuity, such as in a circuit board 32, as well as memory storage means 34, electrically connected to the valved conduit means. The memory typically includes PROM, i.e. programmable read-only memory 36 and RAM, i.e. random access memory 38. The latter is volatile memory and retains stored data only while there is electrical power to the unit. Data collected for each cycle of operation is typically erased from RAM before the next cycle is performed.

Other forms of memory storage, e.g. electrically erasable programmable read-only memory EPROM 40, may also be used for particular control functions.

Coded instructions, used by the circuit board for carrying out the sterilization operating steps, are permanently programmed into the non-volatile PROM memory 36. In this invention, two sets of software program instructions are provided. One set 36a consisting of a user operating mode, is for the normal operation of the apparatus. A second set of instructions 36b consists of a diagnostic operating mode, for use in initially configuring the machine, for diagnosis of operating anomalies and for detection and correction of manufacturing defects.

The diagnostic mode is enabled for operation simply by the installation of a jumper 50 in the circuit board. The jumper permits the operation of the circuit board using the programmed instructions in either the user operation or in the diagnostic mode. Alternatively, the diagnostic mode software may be programmed to permit operation of the machine in only those configurations specified in the diagnostic mode software, i.e. not in the configurations of the user operating mode.

The diagnostic mode includes several time-saving features or submodes which greatly enhance the speed and accuracy of diagnosing suspected hardware and software problems.

In a first submode, the phase operation may be advanced through the phases to a desired phase without completing the intervening phases.

In a second submode, repetitive sterilization cycles may be performed without opening the sterilizer chamber door. This sub-mode may be combined with the phase advance feature of the first submode to enable rapid repetitive operation of a single phase or step of interest.

Another feature of the invention is that of recording or printing out measured temperatures, pressures, or other variables of interest to the diagnostician using a conventional printing-type recorder 52. Such measurements are of no interest in normal operation of the sterilizer. Also, while in the diagnostic mode, that mode will be displayed on a screen 56 or by other visible indicating means on the sterilizer control panel so that the diagnostician or repairman will remember to remove the jumper upon completion of the servicing.

As described, electronic microprocessor 30 serves as a control means for an apparatus such as a sterilizer 10. Such a sterilizer has a chamber 12 with a closable door 14 and valved conduit means 18 for evacuating the chamber 12, introducing the sterilant to the chamber 12, processing a load of articles (not shown) in the chamber 12 by contact with the sterilant for a specified time at predetermined temperature and/or pressure. The sterilizer has monitoring means 58, 59, and 60 for monitoring the temperature(s) and often, the pressure as well. Typically, the only temperature monitored during normal operations is the chamber atmosphere temperature measured by temperature monitoring means 58. The actual chamber wall temperature, however, may be measured by monitoring means 59 and used for the temperature control system.

The microprocessor control means includes a circuit board typically configured for communicative control of a timing means 62, heating means 22, evacuation means 64, sterilant introduction means 66, vent means 68 and purge means 70. The particular apparatus being controlled depends upon the particular type and construction of the sterilizer 10, and the circuit board 32 controls all of the functions which require such control for effective operation.

The PROM memory 36 may be of any physical form which may be effectively used in the particular application. A first software program 36a in the PROM controls the circuit board in the user operation mode. The second software program 36b programmed in the same PROM device comprises instructions for controlling the circuit board in the diagnostic mode. The first software program communicates through a first electric conduit 71 with the circuit board. The second software program and/or the first software program is selectably communicated through a second electric conduit 72 with the circuit board, and the second conduit includes the manually removable and insertable conductive jumper 50 which is inserted in a jumper connection on the circuit board.

The advantages of the invention are many. The installation of the diagnostic software in the PROM memory is very inexpensive, and eliminates the need for additional electronic circuitry for performing the diagnostic functions.

The invention eliminates the need for a separate device which the repairperson must carry about. The particular diagnostic program entered in the PROM will be specific to that particular model of sterilizer, so the repairperson cannot use the wrong program for the machine.

The program allows rapid diagnosis not previously available, by eliminating operation of phases not of interest. Thus, downtime due to malfunction is greatly reduced.

Information not previously available without extra hookups is immediately available for diagnosis.

Testing of components during and following manufacture is greatly eased and performed in less time. Initial calibration of the control circuits may be performed automatically by the software.

This invention is described herein as applying to a specific sterilizer. The diagnostic operating mode may be installed in accordance with this invention, however in any machine which is controlled by a microprocessor having electronic circuitry controlled or acted upon by a software program in PROM or other non-volatile memory.

Reference herein to details of the illustrated embodiments is not intended to restrict the scope of the appended claims which themselves recite those features regarded as important to the invention.

What is claimed is:

1. An electronic microprocessor control means for a sterilizer which has a chamber with a closable door, timing means, heating means, evacuation means, sterilant introduction means, temperature control means, vent means, purge means and valved conduit means structured and arranged for evacuating the chamber, introducing the sterilant to said chamber, and processing a load of articles in the chamber by contact with said sterilant for a specified time period at predetermined temperature and pressure conditions, said electronic microprocessor control means having monitoring means for measuring and controlling operating variables and comprising:

circuit board means configured for communicative control of said timing means, heating means, evacuation means, sterilant introduction means, temperature control means, vent means and purge means;

PROM memory storage means for storage and recall of binary signals controlling said circuit board means to operate said sterilizer;

first software means programmed in said PROM memory storage means, said first software means comprising a program for controlling said circuit board means in a user operation mode comprising complete cycles of ordered sequences of phases including a power-on phase, an evacuation phase, a processing/sterilizing phase, a purge phase and a cycle completion phase;

second software means programmed in said PROM memory storage means, said second software means comprising a program for controlling said circuit board means to controllably operate said sterilizer in said user operation mode or in a diagnostic operation mode for initial calibration, determining freedom from defects, and diagnostic analysis of said sterilizer;

first conduit means communicates said first software means with said circuit board means to carry out said user operation mode;

second electric conduit means for selectable communication of said second software means with said circuit board means to carry out either said user operation mode or said diagnostic operation mode; and removable means to selectively connect said second electric conduit means between said first software means and/or said second software means and said circuit board means, whereby the circuit board means may be operated in either the user operation mode or the diagnostic operation mode.

2. The control means of claim 1, wherein said removable means to selectively connect said second electric conduit means and said circuit board means comprises a manually removable insertable conductive jumper insertable into and removable from a receptacle in said circuit board means for initiating said communication between said second software means and said circuit board means.

3. The control means of claim 1, wherein said diagnostic operation mode includes a selectable submode of: controllably advancing through said phases to a desired phase without completing intervening phases.

4. The control means of claim 1, wherein said diagnostic operation mode includes a selectable submode of: performing repetitive sterilization cycles without opening said sterilizer chamber door between cycles.

5. The control means of claim 1, further comprising indicator means for displaying said mode of operation.

6. The control means of claim 1, wherein said second software means includes means for diagnosing said circuit board means, memory storage means, temperature control means, timing means, heating means, evacuation means, sterilant introduction means, vent means and purge means.

7. The control means of claim 6, wherein said diagnostic operation mode includes temperature sensing means and pressure sensing means in said chamber and electrically connected to said circuit board; and a printing-type recorder electrically connected to said circuit board to print out temperatures and pressures detected by said temperature sensing means and said pressure sensing means.

* * * * *